United States Patent
Sellen et al.

(10) Patent No.: US 11,703,893 B2
(45) Date of Patent: Jul. 18, 2023

(54) GAS PRESSURE REDUCER WITH CAM COMMANDED SHUT-OFF VALVE

(71) Applicant: Rotarex S.A., Lintgen (LU)

(72) Inventors: Stephan Sellen, Wehingen (DE); Philippe Schmitz, Steinsel (LU)

(73) Assignee: ROTAREX S.A, Lintgen (LU)

( * ) Notice: Subject to any disclaimer, the term of this patent is extended or adjusted under 35 U.S.C. 154(b) by 123 days.

(21) Appl. No.: 17/284,696

(22) PCT Filed: Oct. 1, 2019

(86) PCT No.: PCT/EP2019/076598
§ 371 (c)(1),
(2) Date: Apr. 12, 2021

(87) PCT Pub. No.: WO2020/074325
PCT Pub. Date: Apr. 16, 2020

(65) Prior Publication Data
US 2021/0382506 A1 Dec. 9, 2021

(30) Foreign Application Priority Data

Oct. 11, 2018 (LU) .................................. 100957

(51) Int. Cl.
*G05D 16/10* (2006.01)
*F17C 13/04* (2006.01)

(52) U.S. Cl.
CPC ........... *G05D 16/107* (2019.01); *F17C 13/04* (2013.01); *F17C 2205/0329* (2013.01);
(Continued)

(58) Field of Classification Search
CPC ... G05D 16/107; F16K 31/524; F17C 137/04; F17C 2205/0329; F17C 2205/0332;
(Continued)

(56) References Cited

U.S. PATENT DOCUMENTS 5,996,625 A * 12/1999 Collado .................. F17C 13/04
137/614.19
7,922,055 B2 * 4/2011 Nayrac ..................... B25C 1/08
137/322

(Continued)

FOREIGN PATENT DOCUMENTS

EP 1327804 A1 7/2003
FR 2082455 12/1971

(Continued)

OTHER PUBLICATIONS

International Search Report for PCT/EP2019/076598 dated Oct. 31, 2019.
Written Opinion for PCT/EP2019/076598 dated Oct. 31, 2019.

*Primary Examiner* — Jessica Cahill
(74) *Attorney, Agent, or Firm* — Sandberg Phoenix & von Gontard PC

(57) ABSTRACT

A device for regulating the pressure of a compressed gas, comprising a body with a gas inlet, a gas outlet and a gas passage fluidly interconnecting the inlet and outlet; a mobile element carrying a shutter cooperating with a seat in the gas passage, the shutter and the seat forming a regulating valve; a hand-wheel operatively linked to a spindle rotatably mounted on the body; wherein the spindle is hollow and houses a spigot with a cam, the spigot being linked in rotation with the spindle and cooperating with a counter-cam spigot movable in translation but not in rotation relative to the body, and acting on the mobile element or on a shut-off valve for selectively shutting-off and opening the gas passage.

20 Claims, 5 Drawing Sheets

(52) U.S. Cl.
CPC ............... *F17C 2205/0332* (2013.01); *F17C 2205/0338* (2013.01); *F17C 2205/0385* (2013.01); *F17C 2223/0123* (2013.01); *F17C 2227/048* (2013.01)

(58) Field of Classification Search
CPC ...... F17C 2205/0338; F17C 2205/0385; F17C 2223/0123; F17C 2227/048
See application file for complete search history.

(56) References Cited

U.S. PATENT DOCUMENTS

| | | | |
|---|---|---|---|
| 9,593,782 B2* | 3/2017 | Crutsinger | .......... F16K 31/1266 |
| 2003/0150497 A1* | 8/2003 | Rousselin | ............... F16K 1/305 |
| | | | 137/613 |
| 2012/0125449 A1* | 5/2012 | Muzzo | .................... F16K 1/303 |
| | | | 137/333 |

FOREIGN PATENT DOCUMENTS

| | | |
|---|---|---|
| FR | 2749641 A1 | 12/1997 |
| FR | 3024204 A1 | 1/2016 |
| LU | 91582 A1 | 12/2010 |
| WO | WO96/07843 | 3/1996 |

* cited by examiner

GAS PRESSURE REDUCER WITH CAM COMMANDED SHUT-OFF VALVE

CROSS-REFERENCE TO RELATED APPLICATIONS

The present invention is the US national stage under 35 U.S.C. § 371 of International Application No. PCT/EP2019/076598, which was filed on Oct. 1, 2019, and which claims the priority of application LU 100957 filed on Oct. 11, 2018, the content of which (text, drawings and claims) are incorporated here by reference in its entirety.

FIELD

The invention is directed to the field of taps for compressed gas, more particularly to devices for regulating the pressure of compressed gas. Such devices are usually mounted on gas cylinders.

BACKGROUND

Prior art patent document published EP 1 327 804 A discloses a tap for compressed gas comprising a shut-off valve, a pressure reducer and a flow selector. The shut-off valve and the flow selector are both operated by a single hand-wheel carried by a rotatable spindle. The latter comprises a disk with calibrated holes for being selectively positioned in front of a gas passage in order to select a flow rate. The spindle cooperates also with a system that converts a rotation of said spindle into a translation for operating a shut-off valve. The conversion is based on a threaded engagement of an element with the body, the element being driven in rotation by the spindle while being able to translate relative to said spindle. The device can therefore be operated for opening the gas passage and also selecting an appropriate flow rate by rotating the hand-wheel. The inherently low pitch of the threaded engagement implies that the shutter of the shut-off valve is moved over a limited stroke when rotating the hand-wheel over a fraction of a turn. Also, the shutter is downstream of the seat, meaning that a minimum force must be exerted thereon for achieving a proper shut-off of the passage. This requires a very accurate machining and mounting of the many elements thereof. Also, the pressure reducer is arranged laterally, i.e., perpendicularly to the longitudinal axis of the device, rendering thereby the device particularly bulky.

Prior art patent document published WO 96/07843 A1 discloses a device for regulating the pressure of compressed gas, comprising a pressure reducer and a flow selector. A rotatable spindle carried a hand-wheel and a disk with calibrated holes for being selectively positioned in front of a gas passage in order to select a flow rate, similarly to the preceding document. The disk comprises also a cam for pressing the piston of the pressure reducer and thereby urging the shutter thereof against the seat. This teaching is interesting in that it is more compact than the preceding one while providing a proper shut-off function. However, in case of damage to the shutter or the seat of the pressure reducer, the shut-off function might be impaired.

SUMMARY

The invention has for technical problem to alleviate at least one drawback of the above cited prior art.

The invention is directed to a device for regulating the pressure of a compressed gas, comprising: a body with a gas inlet, a gas outlet and a gas passage fluidly interconnecting the inlet and outlet; a mobile element carrying a shutter cooperating with a seat in the gas passage, the shutter and the seat forming a regulating valve, the element delimiting with the body a regulating chamber downstream of the valve and being configured to regulate the gas pressure in the chamber by varying a flow section in the valve dependent on the pressure; a hand-wheel operatively linked to a spindle rotatably mounted on the body and carrying a cam for selectively shutting-off and opening the gas passage; wherein the spindle is hollow and houses a spigot with the cam, the spigot being linked in rotation with the spindle and cooperating with a counter-cam spigot movable in translation but not in rotation relative to the body, and acting on the mobile element or on a shut-off valve for selectively shutting-off and opening the gas passage.

According to an exemplary embodiment, the cam spigot is movable in translation relative to the spindle so as to allow an adjustment thereof.

According to an exemplary embodiment, the device further comprises an adjustment screw engaged in the spindle and supporting the cam spigot, opposite to the cam.

According to an exemplary embodiment, the cam spigot shows a cross-section with an outer polygonal profile engaging a corresponding inner polygonal profile of the spindle, so as to provide the rotational link with the spindle.

According to an exemplary embodiment, the spindle is operatively linked to a flow selector disk with calibrated holes selectively forming the gas passage downstream of the shut-off valve.

According to an exemplary embodiment, the device is designed and configured such that a rotation on a half turn, in various instances quarter turn, or less of the hand-wheel and spindle fully opens the gas passage and the rest of the turn operates the flow selection.

According to an exemplary embodiment, the counter-cam spigot shows a cross-section with an outer polygonal profile engaging a corresponding inner polygonal profile of a support element rigidly mounted on the body.

According to an exemplary embodiment, the support element comprises a portion protruding into and bearing the spindle, the portion showing the corresponding inner polygonal profile.

According to an exemplary embodiment, a gasket is provided between the support element and the spindle, around the protruding portion of the element.

According to an exemplary embodiment, the support element is a plate with a face delimiting the regulating chamber, the plate and the mobile element being configured for cooperating in a gas tight fashion when the pressure at the gas inlet falls under a predetermined pressure, so as to form a residual pressure valve.

According to an exemplary embodiment, the device comprises a spring urging the mobile element towards the support plate and the shutter carried by the element away from the corresponding seat, at least one of the mobile element and the support plate comprising a gasket for contacting the other one of the mobile element and support plate for providing the cooperation in gas tight fashion.

According to an exemplary embodiment, the cam on the cam spigot comprises at least one ramp arranged around a rotation axis of the spigot and the counter-cam spigot comprises corresponding ramp(s).

According to an exemplary embodiment, each of the ramps on the cam spigot and on the counter-cam spigot ends with a flat portion perpendicular to the rotation axis so that relative rotation between the spigots, when the flat portions are in contact, causes no axis translation.

According to an exemplary embodiment, the cam and counter-cam spigots are configured such that the translational movement is achieved by a rotation of the cam spigot which is less than 180°, for example less than 140°, in various instances less than 100°.

According to an exemplary embodiment, the counter-cam spigot is rigidly linked to the mobile element or configured for acting on the mobile element by pressing the shutter carried by the element against the corresponding seat when closing the gas passage.

According to an exemplary embodiment, the shut-off valve comprises a shutter and a seat arranged upstream of the shutter carried by the mobile element and the seat cooperating with the shutter, the shutter of the shut-off valve comprising an operative portion upstream of the corresponding seat and a stem extending through the seat and the mobile element for interacting with the counter-cam spigot.

According to an exemplary embodiment, the seat of the shut-off valve and the seat of the regulating valve are formed on opposite sides of a seat element with a through-hole forming the gas passage and through which the stem of the shutter of the shut-off valve extends.

According to an exemplary embodiment, the shutter carried by the mobile element is annular with a wedged longitudinal profile.

According to an exemplary embodiment, the mobile element is a piston with a protruding portion carrying the shutter, the stem of the shutter of the shut-off valve extending through the protruding portion in a gas tight fashion by means of a gasket between an outer cylindrical surface of the stem and an inner surface of the protruding portion. Advantageously, the diameter of the contact between the gasket and the stem is equal, at least with a tolerance of 10%, to the diameter of the contact area between the shutter and the seat of the regulating valve.

According to an exemplary embodiment, the shutter of the shut-off valve comprises a stem opposite to the stem extending through the mobile element, the opposite stem being slidable in a gas tight fashion with the body so as to end in a cavity at the ambient pressure and to compensate at least partially an effect of the inlet pressure on the shutter when in a shut-off position against the corresponding seat tending to press the shutter against the seat.

The invention is particularly interesting in that it provides an efficient command or actuation assembly for selectively shutting-off and opening the gas passage. The cam mechanism according to the invention is particularly efficient in that it is compact, easy to manufacture, reliable and provides an improved command, essentially in that the gas passage can be fully opened by rotating the hand-wheel over a fraction of turn, e.g., less than a half turn, the rest of a turn being available for the flow selection, if any.

The invention is also interesting in that it provides a very compact design while providing many useful functions, i.e., at least a specific shut-off valve and a pressure reducer. Also, the different elements, e.g., the pressure reducer, are all in-line, i.e., centered on the longitudinal axis of the device. This renders the machining and assembling operations easier and therefore cheaper. Additional functions such as a pressure relief valve, a residual pressure and/or a flow selector can be easily integrated. Also, the pressure reducer can be adjusted while still providing a separate actuation of the shut-off valve. This is particularly useful in that once the outlet pressure has been adjusted, the device can be shut-off and reopened without any change to the setting.

DRAWINGS

FIG. 1 is sectional view of a device for regulating the pressure of a compressed gas, in a shut-off position, according to an exemplary embodiment of the invention.

FIG. 2 corresponds to FIG. 1 where the device in an open position, in accordance with various embodiment of the invention.

FIG. 3 is a perspective view of the cam system of the device of FIG. 1, in the shut-off position, in accordance with various embodiment of the invention.

FIG. 4 corresponds to FIG. 3, the cam system being rotated as in the open position of FIG. 2, in accordance with various embodiment of the invention.

DETAILED DESCRIPTION

Figure 1:
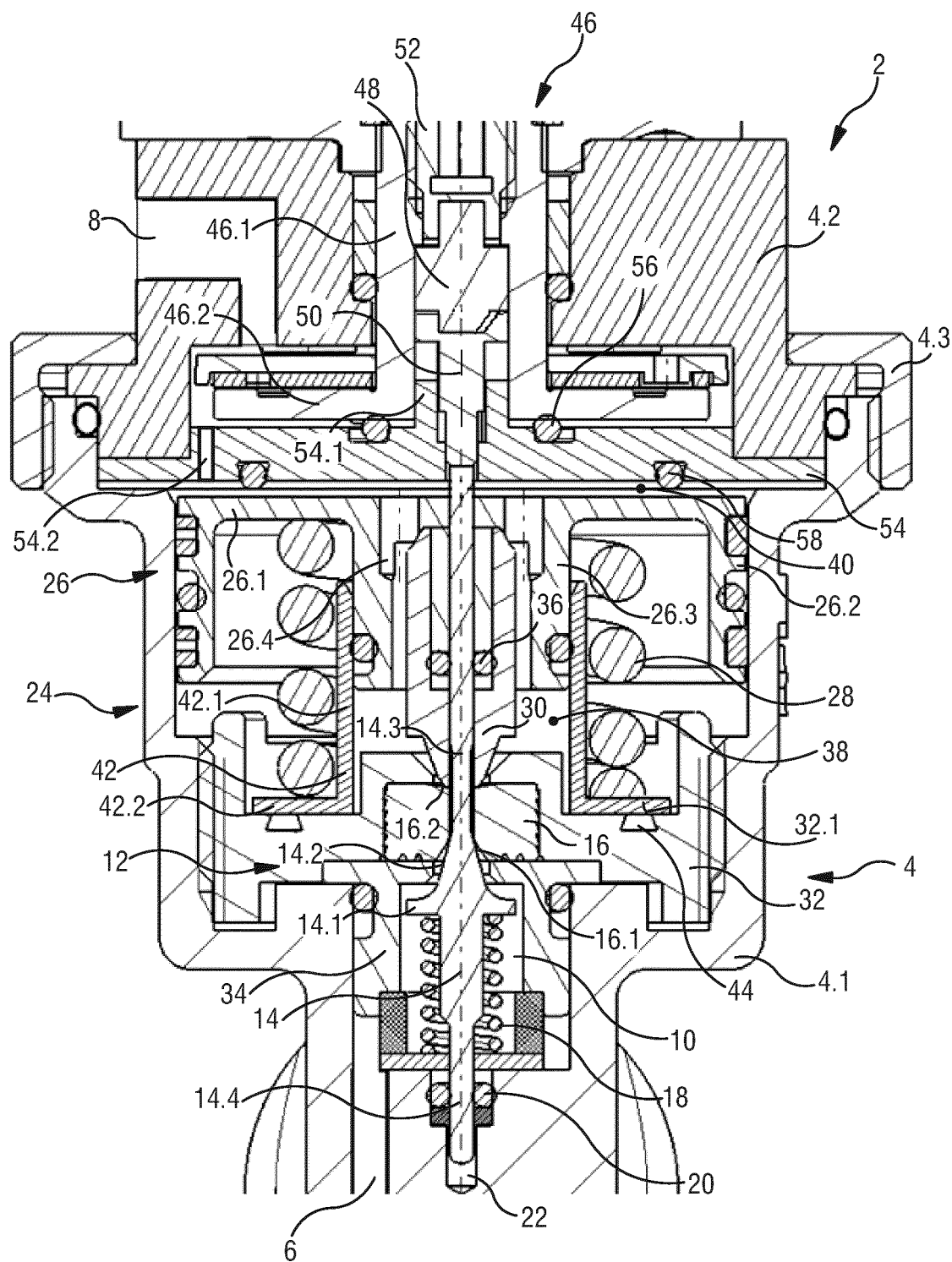
Figure 2:
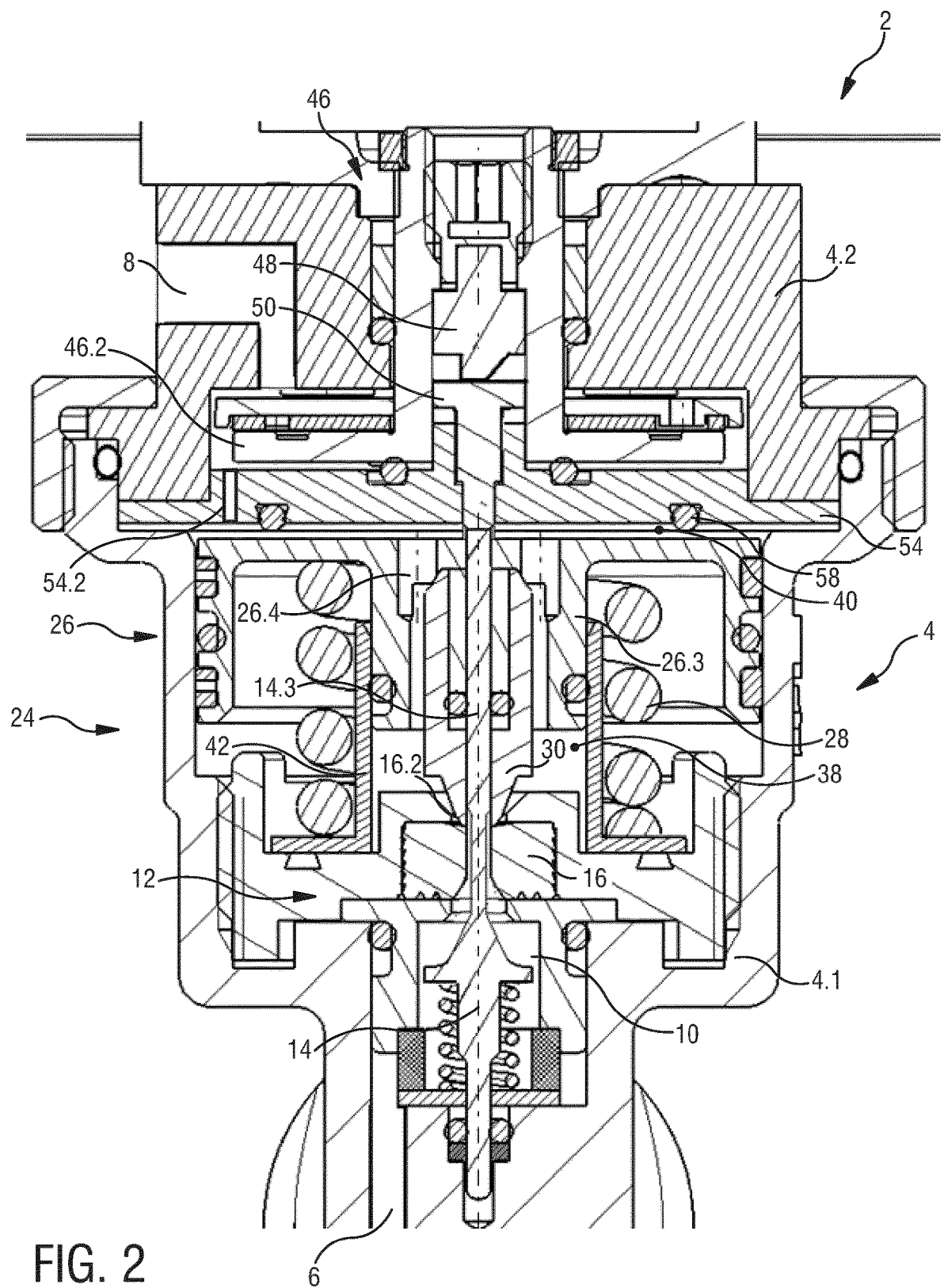
Figure 3:
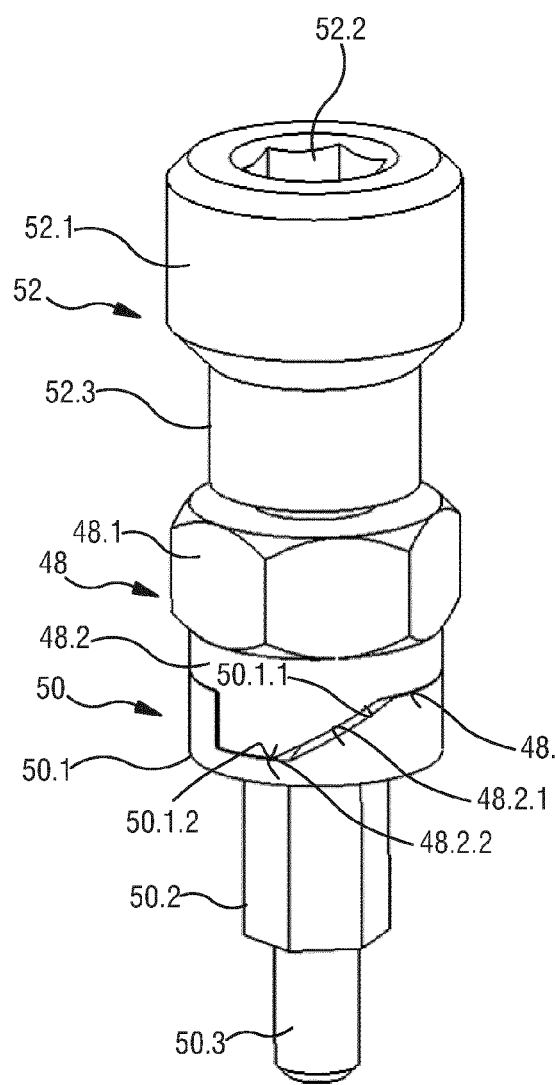
Figure 4:
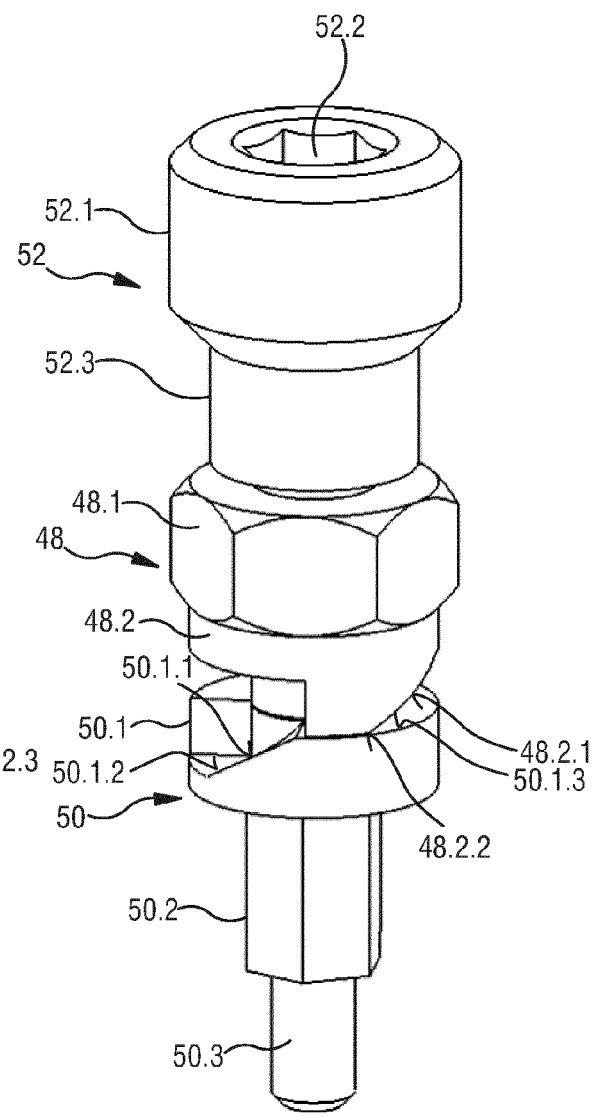

FIGS. 1 to 4 illustrate a device for regulating the pressure of a compressed gas according to an exemplary embodiment of the invention. FIGS. 1 and 2 are sectional views of the device in the shut-off and open positions, respectively, and FIGS. 3 and 4 illustrate the cam system of the device, in the shut-off and open positions, respectively.

With reference to FIGS. 1 and 2, the device 2 comprises a body 4 with a gas inlet 6, a gas outlet 8 and a gas passage 10 interconnecting the inlet and outlet. The body 4 comprises a main portion 4.1 forming a generally cylindrical cavity, and a cover element 4.2 mounted on the opening of the cavity and secured to the main portion by a fastening ring 4.3. The latter is for instance with a female thread engaging a male thread on the main body 4.1 and with a collar resting on a shoulder portion of the cover element 4.2. The latter is received in a gas tight fashion by the main body 4.1 in order to delimit the gas passage 10 in the cavity.

The device 2 comprises a shut-off valve 12 consisting essentially of a shutter 14 and a seat 16.1. More specifically, the shutter 14 comprises an operative and poppet-shaped operative portion 14.1 configured for cooperating, i.e., by contacting, with the seat 16.1. As this is apparent, this portion 14.1 is located upstream of the seat 16.1. For instance, this portion 14.1 shows a flared profile 14.2 contacting, when in the closed or shut-off position as in FIG. 1, a corresponding flared profile of the seat 16.1. A spring 18 is arranged around the shutter 14 in order to urge it against the seat 16.1. As this is apparent, the shutter 14 comprises also a stem 14.3 that extends longitudinally downstream through the seat 16.1. The shutter 14 also comprise an opposite stem 14.4 extending also longitudinally but in the opposite direction. The opposite stem 14.4 is slidably received in a gas tight fashion by means of the gasket 20, in a bore such as to form an auxiliary cavity 22 which can be at the ambient pressure in order to at least partially compensate the resulting force of the gas pressure at the inlet 6 acting on the shutter 14 towards the seat 16.1. The diameter of the opposite stem 14.4 in sliding contact with the gasket 20 is advantageously equal to, or less than the diameter of the contact area between the shutter 14 and the seat 16.1.

Downstream of the shut-off valve 14, the device 2 comprises a pressure reducer 24 consisting essentially of a mobile element 26 urged by a main spring 28 and actuating a regulating valve comprised of the shutter 30 and the seat 16.2. The shutter 30 is carried by the mobile element 26 and the seat 16.2 is in the gas passage downstream of the seat 16.1 of the shut-off valve 12.

For instance, both seats 16.1 and 16.2 are formed on opposed faces of a same seat element 16. The latter can be made of a material that is softer than the material of the shutters 14 and 30, e.g., non-metallic material such as hard plastic. The seat element 16 is trapped between a bottom surface of the cavity and the disk element 32. The latter is attached to the main portion 4.1 of the body, inside the cavity, by an external threaded engagement inside the cavity. The bottom surface of the cavity, supporting the seat element 16 is formed for instance by the element 34 inserted in a corresponding bore formed in the main portion 4.1 of the body. The bottom surface could be alternatively formed directed by the main portion of the body. The mounted element 34 is advantageous for it alleviates the need to provide an access on the opposite side of the body, i.e., for mounting the shutter 14, the spring 18, the gasket 20 and the related parts not specifically described but visible and customary as such to the skilled person.

Back to the pressure reducer 24, the mobile element 26 is in the present example a piston with a disk portion 26.1, an outer cylindrical portion 26.2 slidable in the cavity, and a portion 26.3 protruding centrally from the disk portion 26.1. The protruding portion 26.3 carries the shutter 30. The protruding portion 26.3 comprises also through-holes 26.4 forming gas passage between both sides of the piston 26, i.e., between the chambers 38 and 40. In the present example, the shutter 30 is formed on a generally rod-shaped element that is mounted on the protruding portion 26.3 by screwing. This construction is advantageous for it allows the mounting of the gasket 36 inside the shutter element 30, the gasket cooperating in gas tight fashion with the stem 14.3 of the shutter 14 of the shut-off valve 12.

The outer circular surface of the rod can be threaded and flatted so as to form two opposed parallel outer flat faces extending along the longitudinal axis. These two flat faces have a double function: allowing engagement with a tool for screwing and tightening the shutter in the protruding portion 26.3 of the piston 26, and forming in the protruding portion 26.3 two passages for the gas, in fluid connection with the through-holes 26.4.

As this is apparent, the shutter 30 comprises an end annular surface cooperating with the seat 16.2. That surface surrounds the stem 14.3. The latter shows a reduced diameter in the seat element 16 and in the end portion of the shutter 30, in order to provide some space for the gas to flow.

Advantageously, the diameter of the contact between the gasket 36 and the stem 14.3 is equal, at least with a tolerance of 10%, to the diameter of the contact area between the shutter 30 and the seat 16.2. This compensates the negative effect of the inlet pressure on the shutter which otherwise results in a force on the piston that varies with the inlet pressure.

The low pressure chamber 38, directly downstream of the regulating valve 16.2/30, can be delimited by the circular element 42 showing a cylindrical portion with an inner surface 42.1 guided in translation in a gas tight fashion by the protruding portion 26.3 of the piston 26 and with a radial annular portion with a front surface 42.2 biased in a gas tight fashion by the main spring 28 against a seat surface 32.1 on the body, so as to form a pressure relief valve. The seat surface 32.1 is formed on the disk element 32, i.e., on an outer surface thereof. The seat surface 32.1 comprises a circular groove 44 for receiving a gasket. In case the low pressure in the chamber 38 exceeds a predetermined threshold, the circular element 42 will slightly lift away from the seat surface 32.1, thereby opening the gas tight barrier formed with the gasket in the groove 44 and allow gas to escape.

In the upper part of the device 2, the cover element 4.2 of the body 4 rotatably bears a spindle 46 carrying a hand-wheel (not completely represented). The spindle 46 comprises a hollow cylindrical portion 46.1 and a collar-shaped disk portion 46.2. The disk 46.2 features a series of calibrated holes arranged circumferentially and moving in rotation when the disk is rotated by rotation of the hand-wheel. The principle of such a disk with calibrated holes for selecting a flow rate is well known as such from the skilled person.

The hollow cylindrical portion 46.1 of the spindle 46 houses a cam spigot 48 and a counter-cam spigot 50. The cam spigot 48 shows a non-circular outer surface that rotatably engages with the inner surface of the hollow cylindrical portion 46.1 in order to be able to slide longitudinally in the spindle but not to rotate relative thereto. These surfaces can be polygonal, for instance hexagonal. The cam spigot 48 shows also a front face, i.e., a lower face according to the orientation in FIGS. 1 and 2, with at least one ramp. The cam spigot 48 abuts longitudinally against a screw 52 engaged in the spindle 46 and providing an adjustment means of the longitudinal position of the cam spigot 48. The counter-cam spigot 50 shows an outer upper (according to the orientation in FIGS. 1 and 2) surface, proximal to the cam spigot 48, that is circular or at least that does not engage in rotation with hollow cylindrical portion 46.1 of the spindle 46. It shows however a lower outer surface that is non-circular for rotatably engaging with the support element 54, for instance with the hollow protruding portion 54.1 thereof. The support element 54 is held in position between the main portion 4.1 and the cover element 4.2 of the body 4. The support element 54 comprises a central opening in which each of the counter-cam spigot 50 and the stem 14.3 of the shutter 14 of the shut-off valve extends and contact each other. A rotatable gas tight barrier, formed by the gasket 56, is present between the support element 54 and the disk portion 46.2 of the spindle 46. Also, a gasket (not represented) is provided between the cam spigot 48 or the adjustment screw 52 and the hollow cylindrical portion 46.1 of the spindle 46. The gas flowing from the regulating valve 16.2/30 to the regulating chamber 40 flows then laterally and longitudinally through the passage 54.2 towards the disk portion 46.2 of the spindle 46. As this is apparent, the support element 54, or the piston 26, can show a gasket 58 configured such that when the pressure in the regulating chamber 40 drops down below a predetermined threshold, the piston 26 is urged by the main spring 28 towards the support element 54 so as to contact the gasket 58 and thereby close the gas passage, achieving then a residual pressure function.

Figure 5:
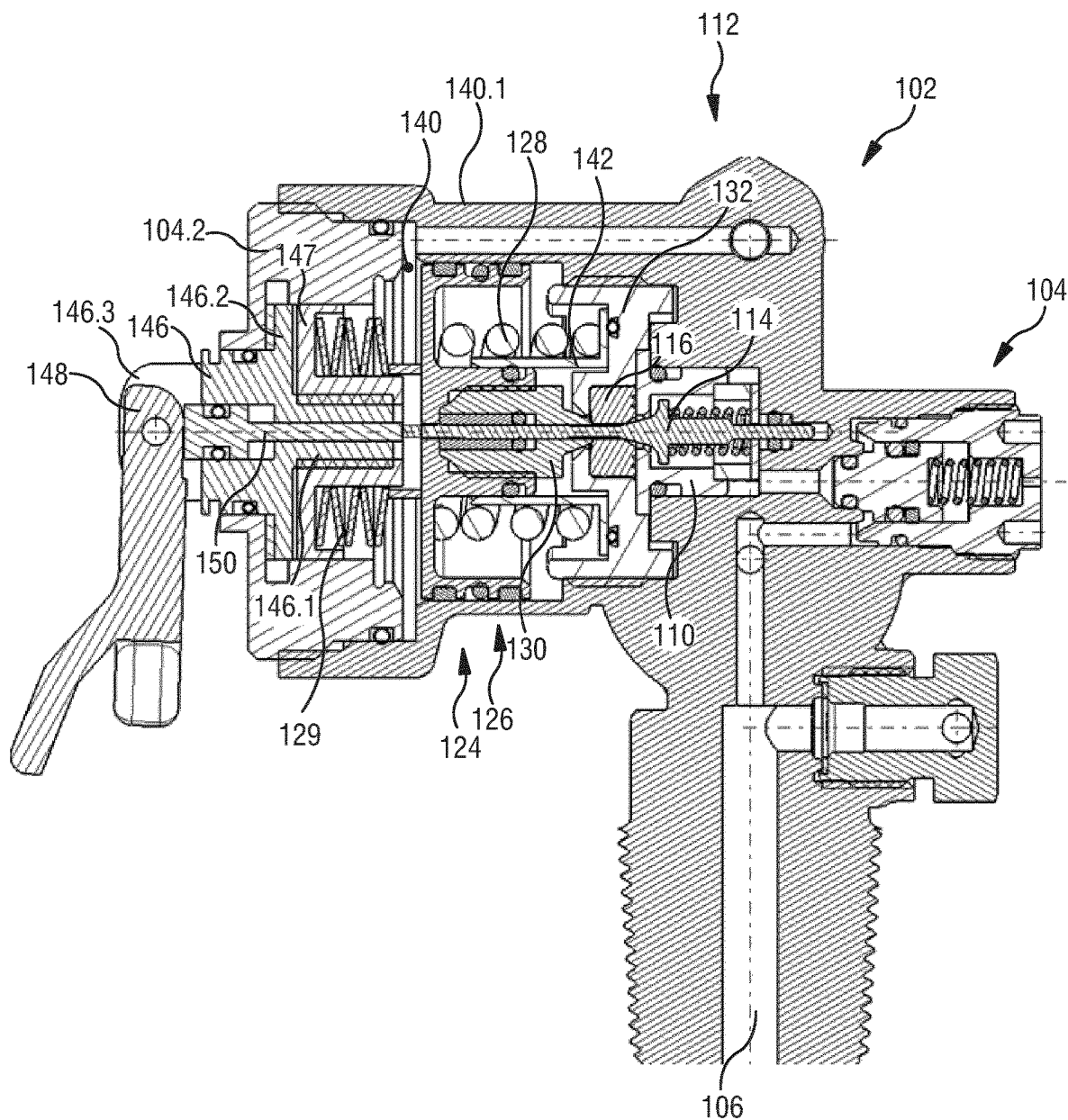
FIG. 5 is sectional view of an example of a device for regulating the pressure of a compressed gas, in accordance with various embodiment of the invention.

The cavity housing the pressure reducer is formed by a generally circular wall of the main portion 4.1 of the body 4. That wall at its distal end cooperating with the support element 54 can be radially enlarged and the support element 54 can be shaped for providing in the regulating chamber 40 a radial passage towards that enlargement for directly fluidly connecting the chamber with a medical outlet, i.e., not passing by the flow selector. To that end, the wall can show a longitudinally raised portion with a longitudinal through-hole in order to fluidly connect the chamber 40 with such an outlet. Such an arrangement is illustrated in FIG. 5. It provides an interesting solution optimizing the material use and the machining operations.

Still with reference to FIGS. 1 and 2, the functioning of the device is the following. In the shut-off or closed position, as illustrated in FIG. 1, the angular position of the hand-wheel is such that the cam system 48/50 is in the contracted state, as illustrated in FIG. 3. In other words, the counter-cam spigot 50 is in a retracted position, i.e., a position where it does not exert a compression force on the stem of the shutter 14 of the shut-off valve 12 and therefor allows the valve to be closed. The resilient force of the spring 18 urges the shutter 14 against the seat 16.1 and maintains the valve closed. The possible slight excess in diameter of the contact area between shutter 14 and seat 16.1 over the diameter of the opposite stem at the gasket 20 can have for effect that the inlet pressure generates an urging force in addition to the force of the spring 18. In the closed or shut-off position as in FIG. 1, there is no pressure in the regulating chamber, meaning that the piston 26 is urged by the main spring 28 against the gasket 58 and closes the integrated residual pressure valve.

After having rotated the hand-wheel, the cam system is in the expanded configuration as visible in FIG. 2 and better illustrated in FIG. 4. In that position, the counter-cam spigot 50 moves the stem 14.3 downwardly (according to the orientation in FIGS. 1 and 2) and thereby opens the shut-off valve 12. The gas under pressure at the inlet 6 can then flow through the seat element 16 and through the regulating valve 16.2/30 which is fully open. The gas flows into the low-pressure chamber 38 and through the passages 26.4 until the regulating chamber 40. A low-pressure builds up in the low-pressure chamber 38 and in the regulating chamber 40 (which is in fluid communication with the low-pressure chamber 38). The positive section difference between the regulating chamber 40 and the low-pressure chamber 38 has for effect that the pressure in these chambers results in a force biasing the piston 26 against the resilient force of the main spring 28, i.e., downwardly (according to the orientation in FIGS. 1 and 2). This movement opens a gas passage between the gasket 58 and the piston 26, i.e., opens the residual pressure valve, and allows gas to flow through the passage 54.2 towards the disk portion 46.2 of the spindle 46 and the outlet 8. The resulting force on the piston of the pressure that builds up of the low-pressure chamber 38 and the regulating chamber 40 regulates the position of the piston and thereby the opening state of the regulating valve 16.2/30. The greater the pressure is, the higher is the resulting force and the lower is the passage in the regulating chamber, and vice versa. This regulation principle is as such well known to the skilled person.

FIGS. 3 and 4 illustrate the cam system of the device of FIGS. 1 and 2, in the collapsed state in FIG. 3 and in the expanded stage in FIG. 4. The collapsed state of FIG. 3 corresponds to the closed or shut-off position of the device in FIG. 1 and the expanded state of FIG. 4 corresponds to the open position of the device in FIG. 2.

As this is apparent in FIGS. 3 and 4, the cam spigot 48 comprises, along the longitudinal axis, a first portion 48.1 with a polygonal outer surface for engaging with a corresponding inner surface of the hollow cylindrical portion of the spindle. It comprises also a second portion 48.2 with an outer surface of a reduced diameter and with at least one ramp 48.2.1 arranged on a circumference around the longitudinal axis. The at least one ramp 48.2.1 ends, in various instances at each circumferential end, with a flat portion 48.2.2 and 48.2.3, i.e., portions that show no height variation.

As this is apparent in FIGS. 3 and 4, the counter-cam spigot 50 comprises, along the longitudinal axis, a first portion 50.1 that mates with the second portion 48.2 of the cam spigot 48. Similarly, the first portion 50.1 comprises at least one ramp 50.1.1 being a counter-ramp of the at least one ramp 48.2.1 of the cam spigot 48. Similarly, the at least one ramp 50.1.1 ends, in various instances at each circumferential end, with a flat portion 50.1.2 and 50.1.3, i.e., portions that show no height variation. In the collapsed configuration in FIG. 3, the flat portions 48.2.2 and 48.2.3 contact the flat portions 50.1.2 and 50.1.3, respectively. The ramps 48.2.1 and 50.1.1 are in vis-à-vis. In the expanded configuration in FIG. 4, the ramp 48.2.1 has slid along the ramp 50.1.1 and the flat portion 48.2.2 rests on the other flat portion 50.1.3. This means that once that state is reached, further rotation does not cause any further change in the distance between the spigots 48 and 50.

The ramps are configured such that the expanded state is achieved upon rotation over a fraction of a turn, in various instances less than a half turn, for example about or less than a quarter turn. This provides a substantially advantage, i.e., that the shut-off valve can be fully opened by rotating the hand-wheel over a limited sector, the remaining rotation until a full turn is attainted being available for providing a large number of positions for selecting the flow rate.

Still with reference to FIGS. 3 and 4, the counter-cam spigot 50 further comprises, along the longitudinal axis, a second portion 50.2 with a non-circular, in various instances polygonal, outer surface for engaging with the inner surface of the hollow portion of the support element 54 (FIGS. 1 and 2). The counter-cam spigot 50 further comprises, along the longitudinal axis, a third portion 50.2 with a circular outer surface and a front face for contacting the stem of the shutter of the shut-off valve.

Still with reference to FIGS. 3 and 4, the adjustment screw 52 comprises, along the longitudinal axis, a first portion 52.1 with an outer thread and an outer axial face with an inner hexagon 52.2 for engaging with a corresponding tool. The adjustment screw 52 further comprises, along the longitudinal axis, a second portion 52.3 of a reduced outer diameter and with a front face contacting the cam spigot 48.

FIG. 5 is a sectional view of an example of a device for regulating the pressure of a compressed gas. The reference numbers of the embodiment are used for designating the same or corresponding elements, these numbers being however incremented by 100. It is also referred to the description of these elements in relation with the embodiment. Specific numbers comprises between 100 and 200 are used for designating specific elements.

The device 102 in FIG. 5 differs from the device in FIGS. 1 to 4 essentially with regard to two aspects.

The first one is that the actuation assembly of the shut-off valve 112 does not comprise a hand-wheel but rather a pivoting lever 148 which cooperates with a rod 150. Rotation of the lever 148 around its pivoting axis causes a translational movement of the rod 150, similarly to the cam system in the first embodiment.

The second aspect is that the device 102 further comprises means for adjusting the outlet pressure of the pressure reducer 124. These means comprise a counter-spring 129 acting on a face of the piston 126 that is opposite to the main spring 128. For instance, the counter-spring 129 is composed of a stack of Belleville washers being however understood that other spring configurations can be considered. The compression of the counter-spring 129 is adjustable by means of an adjustment assembly 146/147 surrounding the actuation assembly 148/150. The adjustment assembly comprises an element 146 rotatably mounted on the body 104, for instance on the cover element 104.2 of the body 104. This rotatable element 146 comprises a shoulder portion 146.2 rotatably resting on a corresponding shoulder portion of the cover element 104.2. It comprises also an elongate portion 146.2, in various instances of a reduced cross-section, in threaded engagement with a counter-element 147 that is slidable but not rotatable in the body 104. The counter-element 147 shows a non-circular, e.g., polygonal, outer surface that rotatably engages with a corresponding inner surface of the cover element 104.2. The counter-spring 129 rests on the counter-element 147. Upon rotation of the rotatable element 146, the counter-element 147 is progressively translated longitudinally and varies the compression of the counter-spring 129. This variation varies the resulting elastic forces mechanically exerted on the piston 126, i.e., by the main spring 128 and also by the counter-spring 129. This varies then the outlet reduced pressure of the pressure reducer 124.

As this is apparent in FIG. 5, the pivoting lever 148 is carried by the rotatable element 146 via a clevis fastener 146.3. This means that the lever 148 can be operated in two manner, i.e., a first one by pivoting the lever for opening or closing the shut-off valve, and a second one by rotating the lever 148 and the rotatable element 146 around the longitudinal axis thereof for adjusting the outlet pressure. This is particularly advantageous in that once a proper outlet pressure is obtained further to adjusting the rotational position of the lever 148 and the rotatable element 146, the device can be shut-off and thereafter reopened without altering the pressure adjustment.

Indicia can be provided on the outer faces of the rotatable element 146 and the cover element 104.2 in order to register various angular positions of the rotatable element, where these positions can be associated with specific outlet pressures.

Figure 6:
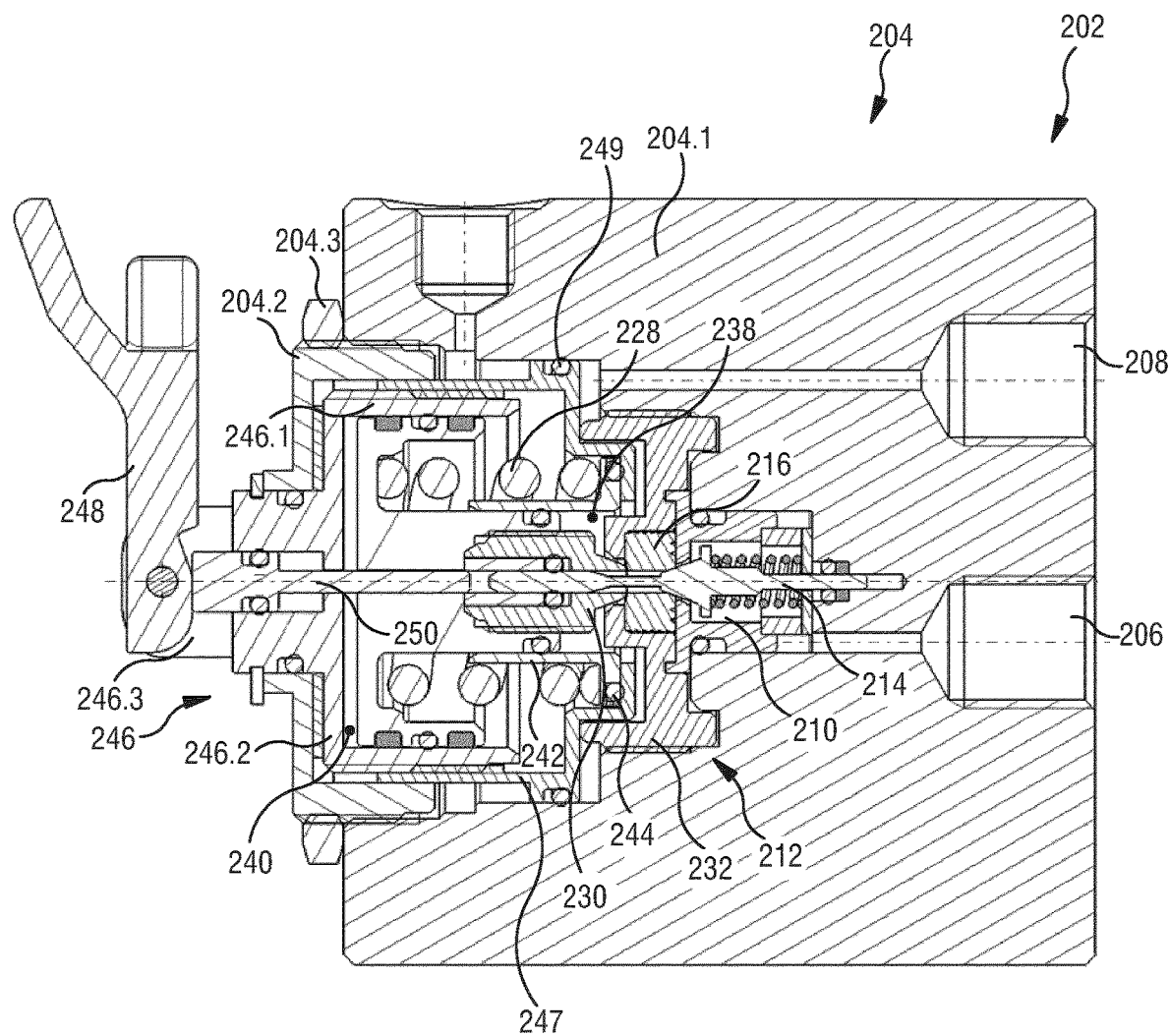
FIG. 6 is sectional view of another example of a device for regulating the pressure of a compressed gas, in accordance with various embodiment of the invention.

FIG. 6 is a sectional view of another example of a device for regulating the pressure of a compressed gas. The reference numbers of the embodiment and the example are used for designating the same or corresponding elements, these numbers being however incremented by 100 and 200, respectively. It is also referred to the description of these elements in relation with the embodiment and example. Specific numbers comprised between 200 and 300 are used for designating specific elements.

The device 202 in FIG. 6 differs from the device in FIG. 5 essentially in that the pressure reducer 224 is adjusted by varying the compression of the main spring 228 instead of providing a counter-spring and varying the compression thereof. To that end, the rotatable element 246 comprises a cylindrical wall 246.1 with an inner surface slidably receiving the piston 226. Similarly, to the second embodiment in FIG. 5, the shoulder portion 246.2 rotatably rests on a corresponding shoulder portion of the cover element 204.2. The cylindrical wall 246.1 comprises an outer thread that engages an inner thread of the counter-element 247. The latter is slidable but not rotatable in the body 204. To that end, the outer surface thereof can be polygonal and slidingly engage a corresponding inner surface of the cover element 204.2. The counter-element 247 also forms the bottom of the cavity on which the main spring 228 rests. More specifically, in the present example comprising a pressure relief valve, the circular element 242 radially delimiting the low-pressure chamber 238 rests on the counter-element 247. In the present example, the front face of the circular element 242 shows a circular groove or a circular shoulder 244 receiving a gasket for providing a gas tight contact with the bottom surface of the cavity formed by the counter-element 247. The latter shows a gasket 249 on an outer surface for forming a gas tight barrier with the cavity formed in the main body 204.1. Advantageously, the cover element 204.2 is secured to the main body 204.1 by means of the lock ring 204.3, thereby enabling a fine adjustment when assembling the device.

The arrangement of this second example is advantageous over the first one essentially in that is more compact in the longitudinal direction.

It is to be noted that the actuating mechanisms of the shut-off valve described in FIGS. 5 and 6, i.e., with the pivoting lever, can be applied without the adjustment assembly for the pressure reducer. Similarly, the adjustment assemblies for the pressure reducer described in FIGS. 5 and 6, i.e., with the adjustable counter-spring or with the adjustable main spring, can be applied without the actuating mechanisms of the shut-off valve.

The invention claimed is:

1. A device for regulating the pressure of a compressed gas, said device comprising:
   a body with a gas inlet, a gas outlet and a gas passage fluidly interconnecting the inlet and outlet;
   a mobile element carrying a shutter cooperating with a seat in the gas passage, the shutter and the seat forming a regulating valve, the element delimiting with the body a regulating chamber downstream of the regulating valve and being configured to regulate the gas pressure in the chamber by varying a flow selection in the regulating valve dependent on the pressure;
   a hand-wheel operatively linked to a spindle rotatably mounted on the body; and
   a cam and a counter-cam spigot, a relative rotation between the cam and the counter-cam spigot being operable by the spindle, the counter-cam spigot acting on the mobile element or on a shut-off valve for selectively shutting-off and opening the gas passage.

2. The device according to claim 1, wherein the spindle is hollow and houses a cam spigot with the cam, the cam spigot being linked in rotation with the spindle and cooperating with the counter-cam spigot movable in translation but not in rotation relative to the body.

3. The device according to claim 2, wherein the cam spigot is movable in translation relative to the spindle so as to allow an adjustment thereof, and the device further comprises an adjustment screw engaged in the spindle and supporting the cam spigot, opposite to the cam.

4. The device according to claim 2, wherein the cam spigot shows a cross-section with an outer polygonal profile engaging a corresponding inner polygonal profile of the spindle, so as to provide the rotational link with the spindle.

5. The device according to claim 2, wherein the cam on the cam spigot comprises at least one ramp arranged around a rotation axis of the spigot and the counter-cam spigot comprises corresponding ramp(s).

6. The device according to claim 5, wherein each of the ramps on the cam spigot and on the counter-cam spigot ends with a flat portion perpendicular to the rotation axis so that relative rotation between the spigots, when the flat portions are in contact, causes no axial translation.

7. The device according to claim 5, wherein the cam and counter-cam spigots are configured such that the translational movement is achieved by a rotation of the cam spigot which is less than 180°.

8. The device according to claim 1, wherein the spindle is operatively linked to a flow selector disk with calibrated holes selectively forming the gas passage downstream of the regulating valve.

9. The device according to claim 8, wherein the device is designed and configured such that a rotation of a half turn or less of the hand-wheel and spindle fully opens the gas passage and the rest of a turn operates a flow selection by the flow selector disk.

10. The device according to claim 1, wherein the counter-cam spigot shows a cross-section with an outer polygonal profile engaging a corresponding inner polygonal profile of a support element rigidly mounted on the body.

11. The device according to claim 10, wherein the support element comprises a portion protruding into and bearing the spindle, the portion showing the corresponding inner polygonal profile.

12. The device according to claim 11, wherein a gasket is provided between the support element and the spindle, around the protruding portion of the element.

13. The device according to claim 10, wherein the support element is a plate with a face delimiting the regulating chamber, the plate and the mobile element being configured for cooperating in a gas tight fashion when the pressure at the gas inlet falls under a predetermined pressure, so as to form a residual pressure valve.

14. The device according to claim 13, wherein the device comprises a spring urging the mobile element towards the support plate and the shutter away from the seat, at least one of the mobile element and the support plate comprising a gasket for contacting the other one of the mobile element and support plate for providing the cooperation in gas tight fashion.

15. The device according to claim 1, wherein the counter-cam spigot is rigidly linked to the mobile element or configured for acting on the mobile element by pressing the shutter carried by the element against the corresponding seat when closing the gas passage.

16. The device according to claim 1, wherein the shut-off valve comprises a shutter and a seat arranged upstream of the shutter carried by the mobile element and the seat cooperating with the shutter, the shutter of the shut-off valve comprising an operative portion upstream of the corresponding seat and a stem extending through the seat and the mobile element for interacting with the counter-cam spigot.

17. The device according to claim 16, wherein the seat of the shut-off valve and the seat of the regulating valve are formed on opposite sides of a seat element with a through-hole forming the gas passage and through which the stem of the shutter of the shut-off valve extends.

18. The device according to claim 16, wherein the shutter carried by the mobile element is annular with a wedged longitudinal profile.

19. The device according to claim 16, wherein the mobile element is a piston with a protruding portion carrying the shutter, the stem of the shutter of the shut-off valve extending through the protruding portion in a gas tight fashion by means of a gasket between an outer cylindrical surface of the stem and an inner surface of the protruding portion.

20. The device according to claim 19, wherein the shutter of the shut-off valve comprises a stem opposite to the stem extending through the mobile element, the opposite stem being slidable in a gas tight fashion with the body so as to end in a cavity at the ambient pressure and to compensate at least partially an effect of the inlet pressure on the shutter when in a shut-off position against the corresponding seat tending to press the shutter against the seat.

* * * * *